July 11, 1933. W. H. BASELT 1,917,354
BRAKE RIGGING
Filed Dec. 11, 1929 2 Sheets-Sheet 1
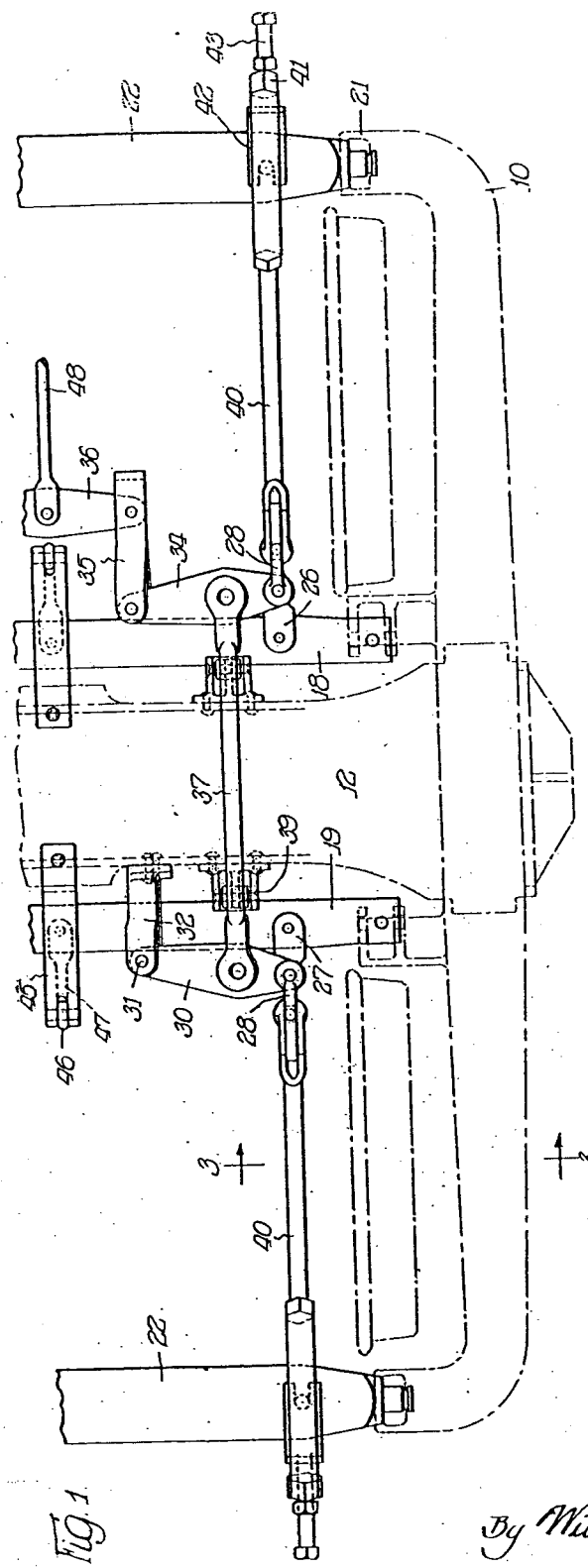
Inventor:
Walter H. Baselt,
By Wilkinson, Huxley, Byron & Knight
attys.

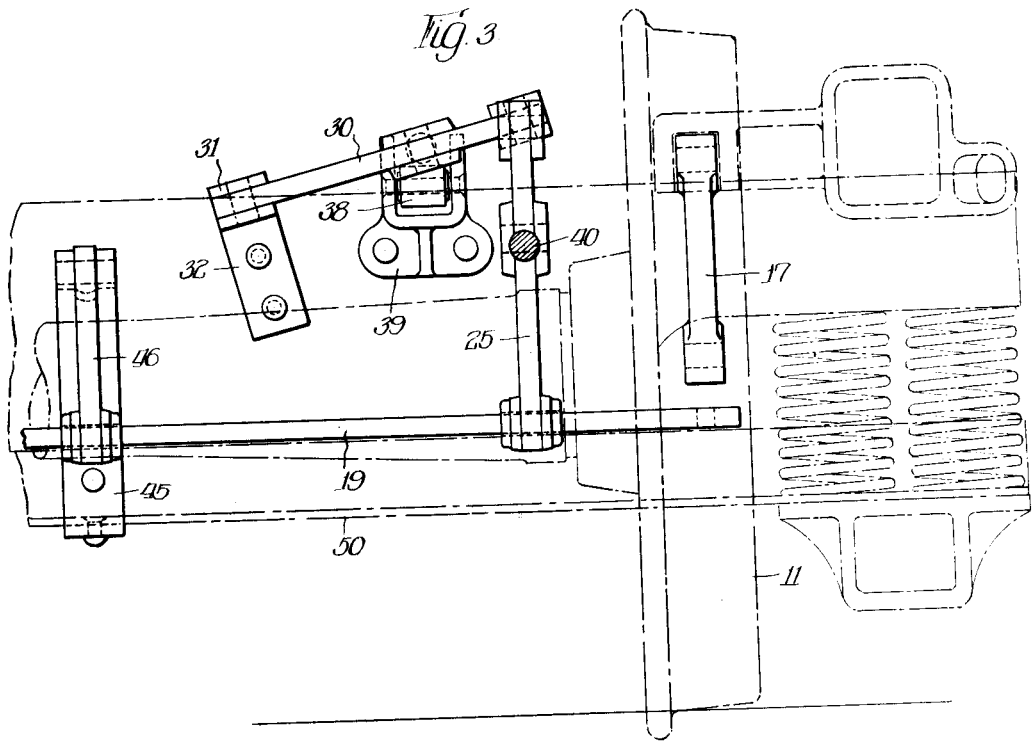
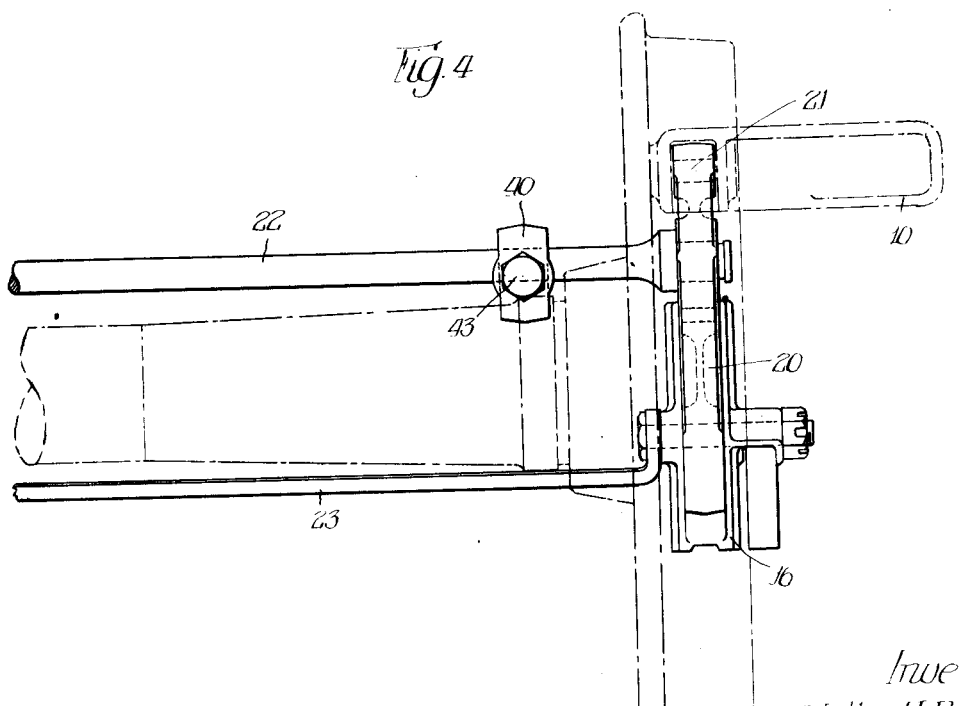

Patented July 11, 1933

1,917,354

UNITED STATES PATENT OFFICE

WALTER H. BASELT, OF CHICAGO, ILLINOIS, ASSIGNOR TO AMERICAN STEEL FOUNDRIES, OF CHICAGO, ILLINOIS, A CORPORATION OF NEW JERSEY

BRAKE RIGGING

Application filed December 11, 1929. Serial No. 413,241.

The invention relates to brake rigging for railway cars, and has reference more particularly to a type of rigging wherein brake shoes are applied to both sides of car wheels and known as the clasp type.

An object of the invention is to provide an improved construction of the above type in which a double set of truck levers and rods are employed, one at each side of the truck frame and wherein the actuating levers for the live truck levers with their connecting rods will be supported from a bolster of the truck.

A further object is to provide a brake rigging of the above type wherein the actuating levers for the live truck levers and their connecting links form a flexible connection so that motion of the bolster due to the action of its supporting springs will not be transmitted to those brake parts rigidly secured to the frame. Preferably the construction of the truck frame and bolster provides for the bolster to be spring supported from the frame. This allows the bolster to have motion independent of the frame and necessitates a flexible connection in the brake rigging between those parts rigidly secured to the frame, and those secured to the bolster, which has particularly been provided for by the improved structure of the present invention.

A yet further object is to provide a brake rigging of simple construction which will be light in weight, and effective and positive in operation.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of one form of clasp type of brake embodying the improved construction of the present invention;

Figure 2 is a longitudinal elevational view of the same;

Figure 3 is a sectional view taken substantially along line 3—3 of Figure 1;

Figure 4 is an end elevation of the arrangement shown in Figure 1.

Although the drawings and description pertain to only one side of the truck, it is understood that the same applies to the other side as well, i. e., there is a double set of brake levers and connections.

The improved construction is shown as applied to a four-wheel truck comprising a truck frame 10 and car wheels 11 having a transverse bolster 12 resiliently mounted centrally of the frame for movement relative thereto. The wheels on each side of the truck frame are engaged by brake shoes 13 and 14 designating the inside and outside shoes respectively. Brake heads 15 engage their corresponding inside shoes and heads 16 engage their outside shoes. The former are in turn suspended from the frame by hangers 17 and are secured to the outer end of transversely extending brake beams 18 and 19 as shown in Figure 1. The brake heads 15 with their corresponding beams 18 and 19 are in this manner suspended from the frame 10.

The outside brake heads 16 are pivotally secured to the dead truck levers 20 which have pivotal engagement with the frame 10 as at 21. Brake beams 22 are also employed extending transversely of the frame said connection being at a position on the dead truck levers intermediate the ends thereof for joining the dead truck levers 20 on both sides of the frame. Spacing or tie members 23 (Figure 4) are provided extending transversely and substantially parallel with the beams 22, and serve to join the brake shoes 16 on both sides of the frame so that the shoes are maintained in alignment with the tread of the car wheels.

Live truck levers are located to the inside of the car wheels at both sides of the truck and designated 24 and 25. The lever 24 is connected at its lower end to a fulcrum member 26 secured to the brake beam 18, and the lever 25 is connected in a similar manner to the brake beam 19 by fulcrum member 27.

The upper end of the live truck lever 25 is pivotally connected through the pair of clevises 28 to a dead lever 30 which is fulcrumed at 31 to the bolster 12 by means of a bracket 32. The truck lever 24 is connected through the similar clevises 28 to a live lever 34 which in turn is connected by a link 35 to an end of a floating or equalizing lever 36 which is correspondingly connected at its opposite end to the brake system on the opposite side of the truck. The pair of clevises 28 permit of relative angular motion between the levers connected thereby and provide a substantially universal connection within the operative limitations of the levers.

The live lever 34 and dead lever 30 are connected intermediate their ends by a tie rod 37 which rests on rollers 38 mounted in suitable brackets 39 and secured to the bolster 12. Connecting rods 40 are employed which connect the live truck levers 24 and 25 with the end brake beams 22. These live truck levers are in this manner connected to the dead truck levers 20. For taking up slack in the brake rigging the connecting rods 40 are provided with a slack adjuster 41 comprising an adjusting member 42 and a screw 43. By rotating the screw 43 the member 42 can be located in any position desired, which depends on the length of the rod 40 required. Through the rods 40, levers 24 and 25, and fulcrum members 26 and 27, the brake beams 18 and 19, and their corresponding brake heads 15 are connected into the brake rigging and thus with the outside brake heads 16. For preventing the beams 18 and 19 from tilting and for supporting the weight of the live truck levers thereon, a midpoint support is provided which consists of a bracket 45 secured to the spring plank 50, which is supported by frames 10 and has pivotally connected thereto a hanger 46. The hanger is connected to the beams by a fulcrum member 47.

For operation of the brakes a pressure cylinder not shown is suitably connected to the rod 48, which in turn is centrally connected to the floating or equalizing lever 36. This lever, as has been described, is of course secured at both ends to the live levers 34, since it is understood that the mechanism shown in Figure 1 is duplicated on the other side of the truck. Upon actuation of the live levers 34 each set of truck levers is brought into operation to apply the brake shoes 13 and 14 to the car wheels. The live truck levers 24 and 25 are, by reason of this construction, supported from the truck frame, since the brake-beams are centrally supported from the spring plank and frame by the hanger 46, whereas the actuating levers, that is, the live levers 34 and dead levers 30, are supported from the bolster. The pivotal connecting clevises 28 therefore serve a definite function and are of prime importance in the present construction, as they allow movement of the bolster independent of truck frame, while at the same time impart the necessary actuation to the live truck levers.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake rigging, the combination with a truck provided with a centrally disposed bolster, a plurality of truck levers, coupling rods connecting certain of said truck levers, other levers one of which is mounted on said bolster having pivotal connection with certain of said truck levers, and a tie rod joining said other levers and adapted to have frictionless engagement upon said bolster.

2. In a brake rigging, the combination with a truck provided with a centrally disposed bolster, a plurality of truck levers, coupling rods connecting certain of said truck levers, other levers having pivotal connection with certain of said truck levers and mounted to move with said bolster, brackets secured to said bolster, rollers journaled in said brackets, and a tie rod joining said other levers and adapted to have engagement with said rollers.

3. In a brake rigging, the combination with a wheeled truck provided with a centrally disposed bolster, a plurality of truck levers, coupling rods connecting certain of said truck levers and disposed inwardly of said wheels, other levers having pivotal connection with certain of said truck levers, a tie rod joining said other levers and having frictionless support upon the bolster, and means connected to one of said other levers for actuating said lever for imparting movement to said truck levers.

4. In a brake rigging, the combination with a wheel truck provided with a bolster of dead truck levers at one side of the wheels, live truck levers located on the opposite side of the wheels, coupling rods disposed inwardly of the wheels and connecting said live and dead levers, brake beams extending transversely of the frame and having brake shoes associated therewith, means connecting said brake beams with said truck levers, other levers one of which is pivotally mounted on said bolster, clevises joining said other levers with said live truck levers, a tie rod connecting said other levers and adapted to have frictionless support upon the bolster, and means connected with another of said other levers for actuating said lever and imparting movement to said truck levers.

5. In a brake rigging, the combination with a truck frame having a centrally disposed bolster and a plurality of wheels, brake beams provided with brake shoes supported from said frame and disposed on both sides of each of said wheels, two live truck levers pivotally connected at their lower ends to the brake beams at one side of the wheels, two dead truck levers pivotally connected to the brake beams at the opposite side of the wheels, other levers one of which is pivoted to said bolster, devises pivotally connecting said other levers with the upper end of said live truck levers, and a tie rod connecting said other levers and supported upon said bolster.

6. In a brake rigging, the combination with a wheeled truck frame having a frame member, of dead truck levers at one side of wheels, live truck levers located on the opposite side of the wheels, coupling rods connecting said live and dead levers, other levers, one of which is connected to a certain live truck lever, the other being connected to another live truck lever and to said frame member, means connecting said other levers supported on said frame member, and operating means connected to one of the other levers for operating the truck levers.

7. In a brake rigging, the combination with a truck provided with a centrally disposed bolster, a plurality of truck levers, coupling rods connecting certain of said truck levers, other levers having pivotal connection with certain of said truck levers one of said other levers being pivoted to said bolster, a tie rod joining said other levers and adapted to have supporting engagement upon said bolster, transversely extending brake beams connecting certain of the truck levers, and a midpoint support for the inside brake beams, said support being rigid with the truck.

8. In brake rigging, the combination of a truck having a truck frame and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever.

9. In brake rigging, the combination of a truck having a truck frame and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever.

10. In brake rigging, the combination of a truck having a truck frame and a bolster, spaced wheels cooperating with said frame, dead levers mounted on said truck adjacent the ends thereof, live levers mounted intermediate said wheels, connections between pairs of said dead and live levers, a dead lever connected to one of said live levers and pivoted to said bolster, and means for operating said last named dead lever.

11. In brake rigging, the combination of a truck having a truck frame and a bolster, spaced wheels cooperating with said frame, dead levers mounted on said truck adjacent the ends thereof, live levers mounted intermediate said wheels, connections between pairs of said dead and live levers, a dead lever connected to one of said live levers and pivoted to said bolster, the connection between said last named dead lever and one of said live levers being through devices for providing substantially universal movement, and means for operating said last named dead lever.

12. In brake rigging, the combination of a truck having a truck frame and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever, a portion of said last mentioned means being supported on said bolster.

13. In brake rigging, the combination of a truck having a truck frame and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever, a portion of said last mentioned means being supported on said bolster and including a live lever connected to one of said first named live levers.

14. In brake rigging, the combination of a truck having a truck frame and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever, a portion of said last mentioned means being supported on said bolster and including a live lever connected to the other of said first named live levers.

15. In brake rigging, the combination of a truck having a truck frame and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever, a portion of said last mentioned means being supported on said bolster.

16. In brake rigging, the combination of a truck having a truck frame and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever, a portion of said last mentioned means being supported on said bolster and including a live lever connected to one of said first named live levers.

17. In brake rigging, the combination of a truck having a truck frame and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever, a portion of said last mentioned means being supported on said bolster and including a live lever connected to the other of said first named live levers.

18. In a brake rigging, the combination with a truck having wheels, a truck frame and a bolster mounted for movement in respect thereto, of brake shoes applied to both sides of the wheels, brake levers and rods supported from said truck frame for actuating said brake shoes, and a lever fulcrumed on said bolster and supported from said bolster for actuating said brake levers.

19. In a brake rigging, the combination with a truck having wheels, a truck frame and a bolster mounted for movement in respect thereto, of brake shoes applied to both sides of the wheels, brake levers and rods supported from said truck frame for actuating said brake shoes, a lever fulcrumed on said bolster and connected to one of said brake levers for actuating the same, said connection between said levers comprising a universal joint to allow for said movement between said bolster and truck frame.

20. In a brake rigging, the combination with a truck having wheels, a truck frame and a bolster mounted for movement in respect thereto, of brake shoes applied to both sides of the wheels, brake levers and rods supported from said truck frame for actuating said brake shoes, a dead lever fulcrumed on said bolster and connected to one of said brake levers, a live lever connected to another of said brake levers and to said dead lever for actuating the same, said dead lever and said live lever being supported from said bolster.

21. In a brake rigging, the combination with a truck having wheels, a truck frame and a bolster mounted for movement in respect thereto, of brake shoes applied to both sides of the wheels, brake levers and rods supported from said truck frame for actuating said brake shoes, a dead lever fulcrumed on said bolster and connected to one of said brake levers, a live lever connected to another of said brake levers and to said dead lever for actuating the same, said dead lever and said live lever being supported from said bolster, said connections between said dead lever and said brake lever, and between said live lever and said dead lever, comprising universal joints to allow for said movement between said bolster and said truck frame.

22. In a wheeled truck having a truck frame and a bolster, brake rigging including a dead lever fulcrumed on said bolster, a live lever, a rod connecting said dead lever to said live lever and supported on said bolster.

23. In a wheeled truck having a truck frame and a bolster, brake rigging including a dead lever fulcrumed on said bolster, a live lever, a rod connecting said dead lever to said live lever, and means on said bolster for supporting said rod.

24. In a wheeled truck having a truck frame and a bolster, brake rigging including a dead lever fulcrumed on said bolster, a live lever, a rod connecting said dead lever to said live lever, and roller means on said bolster for supporting said rod.

25. In a wheeled truck having a truck frame and a bolster, brake rigging including a dead lever fulcrumed on said bolster, a live lever, a rod connecting said dead lever to said live lever, and anti-friction means on said bolster for supporting said rod.

26. In a wheeled truck having a truck frame and a bolster, brake rigging including a dead lever fulcrumed on said bolster, a live lever, a rod connecting said dead lever to said live lever, and means on said bolster for supporting said rod, said rod supporting said dead and live levers.

27. In a wheeled truck having a truck frame and a bolster, brake rigging including a dead lever fulcrumed on said bolster, a live lever, a rod connecting said dead lever to said live lever, and roller means on said bolster for supporting said rod, said rod supporting said dead and live levers.

28. In brake rigging, the combination of a truck having a truck frame, a spring plank and a bolster, spaced wheels cooperating with said frame, two sets of brake levers disposed on each side of the truck, certain of said brake levers being connected by brake beams supported on the spring plank, each of said sets including dead levers mounted on said truck adjacent the ends thereof, live levers mounted intermediate said wheels, connections between pairs of said dead and live levers, a dead lever associated with said live levers and connected to said bolster, and means for operating said last named dead lever.

29. In brake rigging, the combination of a truck having a truck frame, a spring plank and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last last named dead lever.

30. In brake rigging, the combination of a truck having a truck frame, a spring plank and a bolster, spaced wheels cooperating with said frame, dead levers mounted on said truck adjacent the ends thereof, live levers mounted intermediate said wheels, connections between pairs of said dead and live levers, a dead lever connected to one of said live levers and pivoted to said bolster, and means for operating said last named dead lever.

31. In brake rigging, the combination of a truck having a truck frame, a spring plank and a bolster, spaced wheels cooperating with said frame, dead levers mounted on said truck adjacent the ends thereof, live levers mounted intermediate said wheels, connections between pairs of said dead and live levers, a dead lever connected to one of said live levers and pivoted to said bolster, the connection between said last named dead lever and one of said live levers being through devices for providing substantially universal movement, and means for operating said last named dead lever.

32. In brake rigging, the combination of a truck having a truck frame, a spring plank and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever, a portion of said last mentioned means being supported on said bolster.

33. In brake rigging, the combination of a truck having a truck frame, a spring plank and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever, a portion of said last mentioned means being supported on said bolster and including a live lever connected to one of said first named live levers.

34. In a brake rigging, the combination of a truck having a truck frame, a spring plank and a bolster, spaced wheels cooperating with said frame, dead levers mounted on said truck adjacent the ends thereof, live levers mounted intermediate said wheels, connections between pairs of said dead and live levers, a dead lever associated with said live levers and connected to said bolster, and means for operating said last named dead lever, a portion of said last mentioned means being supported on said bolster and including a live lever connected to the other of said first named live levers.

35. In brake rigging, the combination of a truck having a truck frame, a spring plank and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever, a portion of said last mentioned means being supported on said bolster.

36. In brake rigging, the combination of a truck having a truck frame, a spring plank and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever, a portion of said last mentioned means being supported on said bolster and including a live lever connected to one of said first named live levers.

37. In brake rigging, the combination of a truck having a truck frame, a spring plank and a bolster, spaced wheels cooperating with said frame, dead levers mounted on said truck, live levers mounted adjacent said wheels, connections between pairs of said dead and live levers, a dead lever associated with said live levers and connected to said bolster, and means for operating said last named dead lever, a portion of said last mentioned means being supported on said bolster and including a live lever connected to the other of said first named live levers.

Signed at Chicago, Illinois, this 2nd day of December, 1929.

WALTER H. BASELT.

CERTIFICATE OF CORRECTION.

Patent No. 1,917,354.                                                              July 11, 1933.

WALTER H. BASELT.

It is hereby certified that error appears in the printed specification of the above numbered patent requiring correction as follows: Page 1, line 83, beginning with the word "said" strike out all to and including "frame" in line 87, and insert instead "for connecting the dead truck levers 20 on both sides of the frame, said connection being at a position on the dead truck levers intermediate the ends thereof"; and that the said Letters Patent should be read with this correction therein that the same may conform to the record of the case in the Patent Office.

Signed and sealed this 29th day of August, A. D. 1933.

M. J. Moore.

(Seal)                                        Acting Commissioner of Patents.